US007472256B1

(12) United States Patent
Nair et al.

(10) Patent No.: US 7,472,256 B1
(45) Date of Patent: Dec. 30, 2008

(54) SOFTWARE VALUE PREDICTION USING PENDENCY RECORDS OF PREDICTED PREFETCH VALUES (75) Inventors: Sreekumar R. Nair, Santa Clara, CA (US); Santosh G. Abraham, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 200 days.

(21) Appl. No.: 11/104,235

(22) Filed: Apr. 12, 2005

(51) Int. Cl.
G06F 9/38 (2006.01)
(52) U.S. Cl. ...................................... 712/207
(58) Field of Classification Search ................ 712/220, 712/240, 244, 207
See application file for complete search history.

(56) References Cited

U.S. PATENT DOCUMENTS

| 5,515,538 | A | 5/1996 | Kleiman |
| 5,617,550 | A | 4/1997 | Matsuo |
| 5,721,957 | A | 2/1998 | Huang et al. |
| 6,029,228 | A * | 2/2000 | Cai et al. ................ 711/137 |
| 6,499,101 | B1 | 12/2002 | Henry et al. |
| 6,523,110 | B1 | 2/2003 | Bright et al. |
| 6,681,318 | B2 | 1/2004 | Chaudhry et al. |
| 6,865,579 | B1 | 3/2005 | Shaylor |
| 6,965,982 | B2 | 11/2005 | Nemawarkar |
| 7,328,433 | B2 | 2/2008 | Tian et al. |
| 2003/0204588 | A1 | 10/2003 | Peebles et al. |
| 2004/0154012 | A1 | 8/2004 | Wang et al. |
| 2004/0154019 | A1 | 8/2004 | Aamodt et al. |
| 2005/0071841 | A1 | 3/2005 | Hoflehner et al. |
| 2005/0125802 | A1 | 6/2005 | Wang et al. |
| 2006/0090063 | A1 * | 4/2006 | Theis ..................... 712/239 |
| 2006/0161762 | A1 * | 7/2006 | Eisen et al. .............. 712/233 |

FOREIGN PATENT DOCUMENTS

EP 0510429 10/1992

OTHER PUBLICATIONS

Li, Xiao-Feng, et al., "Software Value Prediction for Speculative Parallel Threaded Computations," First Value-Prediction Workshop, Jun. 7, 2003, pp. 18-25.
Liao, Steve S.W., et al., "Post-Pass Binary Adaptation for Software-Based Speculative Precomputation," Proceedings of the ACM SIGPLAN 2002 Conference on Programming Language Design and Implementation, 2002, ACM Press, New York, pp. 117-128.
Balkan, Deniz et al., "The Impact of Value Misspeculation on Branch Resolution in Out-of-Order Superscalar Microprocessors," First Value Prediction Workshop (San Diego, California, USA), Jun. 7, 2003, pp. 3-9.

(Continued)

Primary Examiner—Alford W. Kindred
Assistant Examiner—Benjamin Geib
(74) Attorney, Agent, or Firm—Dorsey & Whitney LLP (57) ABSTRACT Profile information can be used to target read operations that cause a substantial portion of misses in a program. A software value prediction technique that utilizes latency and is applied to the targeted read operations facilitates aggressive speculative execution without significant performance impact and without hardware support. A software value predictor issues prefetches for targeted read operations during speculative execution, and utilizes values from these prefetches during subsequent speculative execution, since the earlier prefetches should have completed, to update a software value prediction structure(s). Such a software based value prediction technique allows for aggressive speculative execution without the overhead of a hardware value predictor.

45 Claims, 6 Drawing Sheets

OTHER PUBLICATIONS

Desikan, Rajagopalan et al., "Lightweight Distributed Selective Re-Execution and its Implications for Value Speculation," First Value Prediction Workshop (San Diego, California, USA), Jun. 7, 2003, pp. 10-17.

Hu, Shiwen et al., "The Role of Return Value Prediction in Exploiting Speculative Method-Level Parallelism," First Value Prediction Workshop (San Diego, California, USA), Jun. 7, 2003, pp. 26-33.

Zahran, Mohamed M. et al., "Confidence Estimation for Register Value Communication in Speculative Multithreaded Architectures," First Value Prediction Workshop (San Diego, California, USA), Jun. 7, 2003, pp. 34-40.

Chang, Jichuan et al., "Using Coherent Value Speculation to Improve Multiprocessor Performance," First Value Prediction Workshop (San Diego, California, USA), Jun. 7, 2003, pp. 41-46.

Holly, Matthew & Driesen, Karel, "Achieving Simplified Predictor Designs Using Evolutionary Computation," First Value Prediction Workshop (San Diego, California, USA), Jun. 7, 2003, pp. 47-54.

Sazeides, Yiannakis, "Instruction-Isomorphism in Program Execution," First Value Prediction Workshop (San Diego, California, USA), Jun. 7, 2003, pp. 55-62.

Khamaisee, Assad et al., "Can Hot Traces Improve Value Prediction?," First Value Prediction Workshop (San Diego, California, USA), Jun. 7, 2003, pp. 63-70.

Bhargava, Ravi & John, Lizy K., "Performance and Energy Impact of Instruction-Level Value Predictor Filtering," First Value Prediction Workshop (San Diego, California, USA), Jun. 7, 2003, pp. 71-78.

Koushiro, Takenori & Sato, Toshinori, "An Energy-Efficient Speculative Chip-Multiprocessor Utilizing Trace-level Value Prediction," First Value Prediction Workshop (San Diego, California, USA), Jun. 7, 2003, pp. 79-85.

Loh, Gabriel H:, "Width Prediction for Reducing Value Predictor Size and Power," First Value Prediction Workshop (San Diego, California, USA), Jun. 7, 2003, pp. 86-93.

Annavaram et al., "Data Prefetching by Dependence Graph Precomputation", Proceedings of the 28th Annual International Symposium on Computer Architecture, Göteborg, Sweden, pp. 52-61, Jun. 30-Jul. 4, 2001.

Collins et al., "Speculative Precomputation: Long-range Prefetching of Delinquent Loads", Proceedings of the 28th International Symposium on Computer Architecture, Göteberg, Sweden, pp. 14-25, Jul. 30-Jul. 4, 2001.

Kim et al., "Design and Evaluation of Compiler Algorithms for Pre-Execution", Proceedings of the 10th International Conference on Architectural Support for Programming Languages and Operating Systems, San Jose, California, 12 pages, Oct. 2002.

Kohout et al., "Multi-Chain Prefetching: Effective Exploitation of Inter-Chain Memory Parallelism for Pointer-Chasing Codes", Proceedings of the 10th Annual International Conference on Parallel Architectures and Compilations Techniques", Washington, D.C., pp. 268-279, Sep. 8-12, 2001.

Kohout et al., "Multi-Chain Prefetching: Exploiting Memory Parallelism in Pointer-Chasing Codes", Proceedings of the 2001 International Conference on Parallel Architectures and Compilation Techniques, Washington, D.C., pp. 268-279, Sep. 8-12, 2001.

Wang et al., "Speculative Precomputation: Exploring the Use of Multithreading for Latency", Intel Technology Journal Q1, vol. 6, Issue 1, pp. 1-14, 2002.

Zilles et al., "Understanding the Backward Slices of Performance Degrading Instructions", Proceedings of the 27th Annual International Symposium on Computer Architecture, Vancouver, British Columbia, Canada, pp. 172-181, Jun. 12-14, 2000.

Kim et al., "A Study of Source-Level Compiler Algorithms for Automatic Construction of Pre-Execution Code", ACM Transactions on Computer Systems, vol. 2, No. 3, pp. 1-52, Sep. 2001.

\* cited by examiner

SOFTWARE VALUE PREDICTION USING PENDENCY RECORDS OF PREDICTED PREFETCH VALUES

BACKGROUND

1. Field of the Invention

The present invention relates to the field of computers. More specifically, the present invention relates to value prediction.

2. Description of the Related Art

With advances in microprocessor technology, the clock speeds of processors are significantly faster than speeds of memory systems, which leads to more costly memory accesses. Efficient caching schemes can help reduce memory accesses, but typical cache miss penalties are in the order of hundreds of cycles. When a load misses the cache, the processor waits idly for the missing load to return. Speculative execution aims at using these idle processor cycles to do useful work (like prefetching for memory accesses that are also known to miss in the near future, thereby reducing the overall number of cache misses).

Run-ahead scouting is a speculative execution scheme, where the processor executes some speculative code, while waiting for a cache miss to complete. The typical scheme is where the processor runs ahead and executes code past the missing load, and executes more missing loads that will help improve the memory level parallelism (MLP), and hence the name run-ahead scouting. Run-ahead scouting can execute with or without hardware support, and can execute code from the main thread or code from a compiler generated scout thread.

Some recent studies have indicated that 50% of missing loads in commercial applications, such as database applications, are last-value predictable 90% of the time. This is a useful property that can be exploited, for speculative execution in general and for run-ahead scouting in particular, to speculatively break memory dependencies on values of missing loads, and execute beyond these missing loads. In conventional run-ahead scouting without value prediction, missing loads are skipped and consequently prefetch addresses for subsequent missing loads dependent on the skipped loads cannot be generated. With value prediction, the predicted values of missing loads are propagated to subsequent instructions and often are utilized to generate addresses for subsequent missing loads. Thus, fewer loads are skipped, the average number of missing loads prefetched during speculative executions is increased and overall performance is significantly improved. However, value prediction in hardware is usually very expensive.

SUMMARY

It has been discovered that targeted software value prediction can target candidate missing read operations, as identified with profiling information, and take advantage of latency events. Following the occurrence of a triggering high-latency event during normal execution, such as a cache-miss or store buffer stall condition, a value predictor structure is accessed. Candidate missing read operations marked as pending and prefetched by a prior initiation of speculative execution are likely now available in low-latency memory. The values for these read operations are loaded and used to update the value predictor structure. After updating the value predictor structure, speculative execution is initiated. Upon encountering a candidate missing read operation during speculative execution, a prefetch is initiated and the encountered read operation is registered in the value predictor structure as pending. The value predictor structure is queried for a value prediction for this read operation. If a value prediction is unavailable, subsequent instructions dependent on this read operation are skipped as in conventional speculative execution. If a value prediction is available, it is utilized in subsequent instructions to potentially generate prefetch addresses for other missing read operations. When the triggering high-latency event completes (e.g., cache miss returns), speculative execution is terminated. In non-committal speculative execution, the results produced during speculative execution are not committed to architectural state. The speculative execution is immediately terminated and normal execution resumes from a checkpoint. In committal speculative execution, the value predictions are verified by loading directly from memory and the speculative results are committed to architectural state. If one or more value predictions are incorrect, execution resumes from a checkpoint taken before initiation of speculative execution. This software value prediction mechanism achieves reliable value prediction for those operations incurring the most latency, namely the missing read operations. Furthermore, value prediction accesses and updates have minimal impact on performance because they are performed while the processor is otherwise stalled on a high-latency event.

These and other aspects of the described invention will be better described with reference to the Description of the Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIGS. 1A-1B depict an exemplary software value prediction technique.

The use of the same reference symbols in different drawings indicates similar or identical items.

DESCRIPTION OF THE EMBODIMENT(S)

The description that follows includes exemplary systems, methods, techniques, instruction sequences and computer program products that embody techniques of the present invention. However, it is understood that the described invention may be practiced without these specific details. For instance, the following description uses last-value value prediction for exemplary illustration, even though various realizations of the described invention may use other value prediction techniques, such as context-based value prediction, constant-stride value prediction, hybrid value prediction, etc. In other instances, well-known protocols, structures and techniques have not been shown in detail in order not to obscure the invention.

Figure 1A:
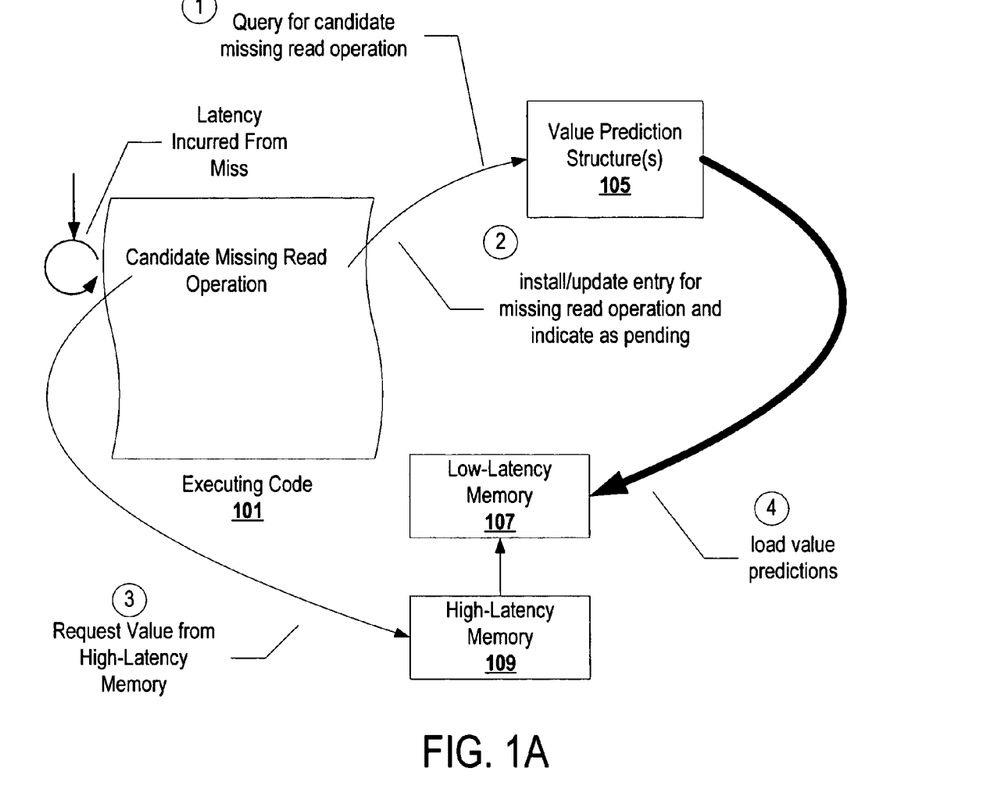
FIG. 1A depicts exemplary utilization of a value predictor structure.
Figure 1B:
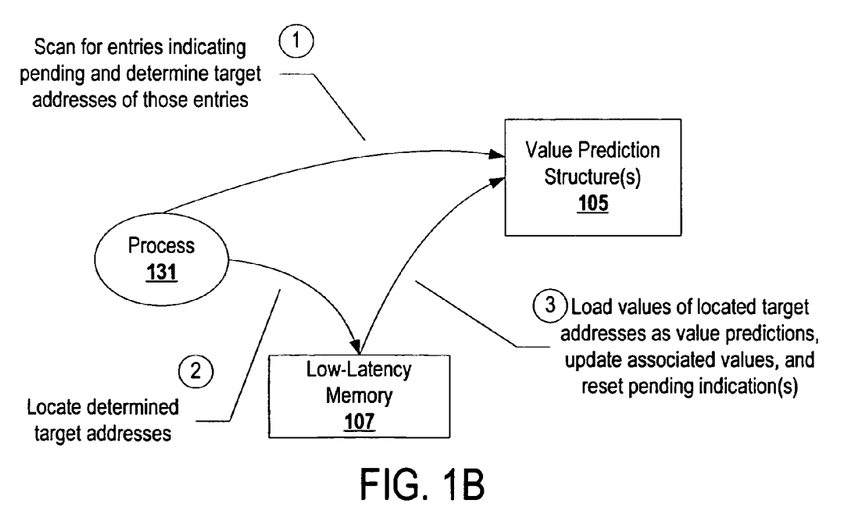
FIG. 1B depicts exemplary accessing of a value predictor structure.

FIGS. 1A-1B depict an exemplary software value prediction technique. FIG. 1A depicts exemplary utilization of a value predictor structure. An executing code 101 includes a candidate missing read operation. The candidate missing read operation has been previously identified with profile information. Hereinafter, read operations that have been identified by profile information as most likely to miss, are referred to as candidate missing read operations. During the latency incurred by a first high-latency event (e.g., the candidate missing read operation), a value predictor structure(s) 105 is accessed and queried for the candidate missing read operation to determine if a corresponding value prediction is available from the value prediction structure(s) 105, at a time 1. At a time 2, an entry is installed or updated for the candidate missing read operation and pendency indication is set for the installed entry. Although the example depicted in FIG. 1A determines whether a value prediction is present, implementations of the described invention may utilize confidence values and provide value predictions if confidence in the value prediction is sufficient. At a time 3, a value for the candidate missing read operation is requested from a high latency memory 109 (e.g., L3 cache, random access memory, etc.), which is coupled with a low-latency memory 107 (e.g., L1 cache, L2 cache, L3 cache, etc.). Whether a memory is low-latency or high-latency is relative to other memory. To illustrate, L3 cache may be low-latency memory relative to random access memory, but L3 cache may be high-latency memory relative to L2 cache. At a time 4, prior to performing the main chores of speculative execution on a subsequent triggering high-latency event, the values for pending accesses are loaded from low-latency memory and used to update the value predictor structures. In order to support committal speculative execution, the above operation is completed prior to terminating the current speculative execution. Further, if the value predictions are correct, the architectural state is updated with the speculative state.

FIG. 1B depicts exemplary accessing of a value predictor structure. In FIG. 1B at a time 1, a process 131 scans the value predictor structure(s) 105 for entries indicating pending prefetch requests and determines target addresses of those entries (e.g., effective addresses that have been recorded for corresponding candidate missing read operations). A target address may be a virtual address, a physical address, a tag, etc. The process may be a speculative execution process (e.g., a scout thread), may be a value prediction process invoked by speculative execution or from a candidate missing read operation, an application that is executing, etc. At a time 2, the process 131 locates the determined target addresses in a low-latency memory 107. At a time 3, the values at the located target addresses are loaded into the value predictor structure(s) and associated values, such as confidence, are updated. Also at time 3, the indication of pending prefetch requests is reset.

Figure 2:
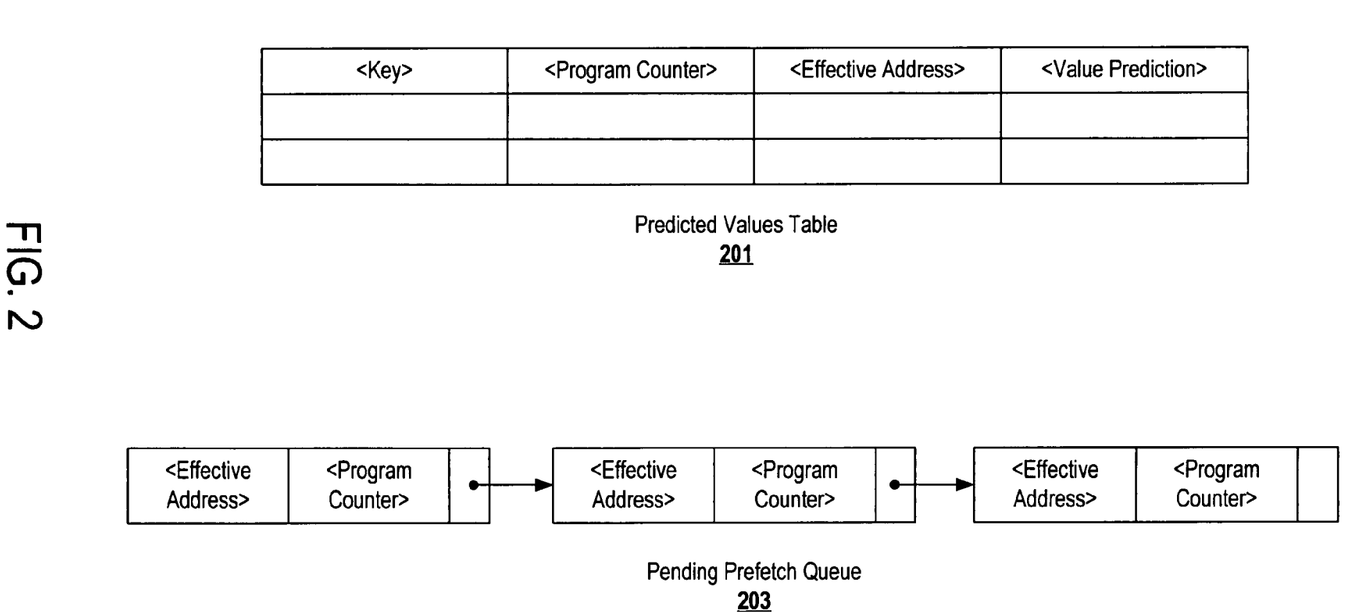
FIG. 2 depicts an exemplary value prediction data structure.

FIG. 2 depicts an exemplary value prediction data structure. The exemplary value prediction data structure of FIG. 2 includes a predicted values table 201 and a pending prefetch queue 203. Each entry of the predicted values table 201 includes a key field, a program counter field, an effective address field, and a predicted value field. The key field is an index into the predicted values table, such as a hash of the program counter. The pending prefetch queue 203 includes a linked list of elements. Each of the elements includes an effective address field and a program counter field. The pending prefetch queue 203 indicates those candidate missing read operations that have been encountered outside of a latency period. As they are encountered, they are prefetched and enqueued into the pending prefetch queue 203. On a subsequent high latency event, the values are now likely in the low-latency memory responsive to the prefetch requests. They are retrieved from low-latency memory, inserted into the predictor values table 201 as value predictions and dequeued from the pending prefetch queue 203.

Figure 3:
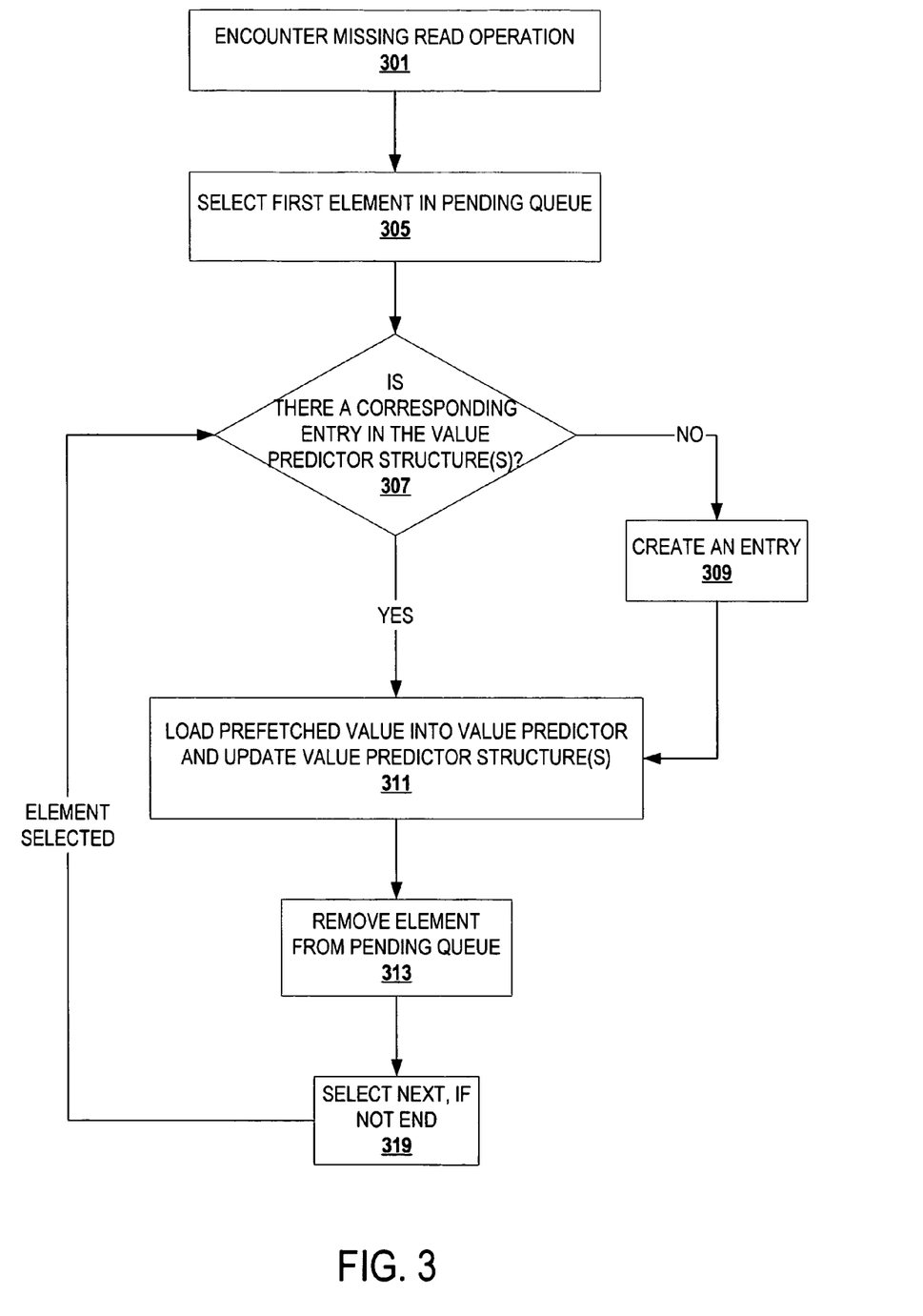
FIG. 3 depicts an exemplary flowchart for updating a value predictor structure.

FIG. 3 depicts an exemplary flowchart for updating a value predictor structure. At block 301, a candidate missing read operation is encountered during normal execution. The high latency incurred from the candidate missing read operation triggers speculative execution. At block 305, a first element of the pending prefetch queue is selected. The enqueued prefeches are those that were submitted during an earlier previous speculative execution, perhaps the immediately preceding speculative execution. It is expected that the prefetches issued in the earlier speculative execution have completed. At block 307, it is determined if there is a corresponding entry in a value predictor structure(s). If there is an entry in the value predictor structure(s) that corresponds to the selected prefetch, then control flows to block 311. If there is not a corresponding entry, then control flows to block 309.

At block 309, an entry is created for the selected prefetch. Control flows from block 309 to block 311.

At block 311, the prefetched value for the selected element is loaded into the value predictor structure(s) and the value predictor structure(s) is updated. Creating/updating an entry in the value predictor structure may involve additional operations, such as setting a confidence bit, replacing one of a number of value predictions, generating a key by hashing the program counter of the corresponding operation, etc. At block 313, the selected element is dequeued from the pending queue. Those of ordinary skill in the art can avail themselves of various techniques available to manage data structures and perform dequeue operations in various operating environments (e.g., multiprocessor, etc.) for implementing block 313. At block 319, a next element in the pending prefetch queue is selected, if the end of the queue has not been reached. If an element is selected (i.e., the end of the queue has not been reached), then control flows back to block 307.

Figure 4:
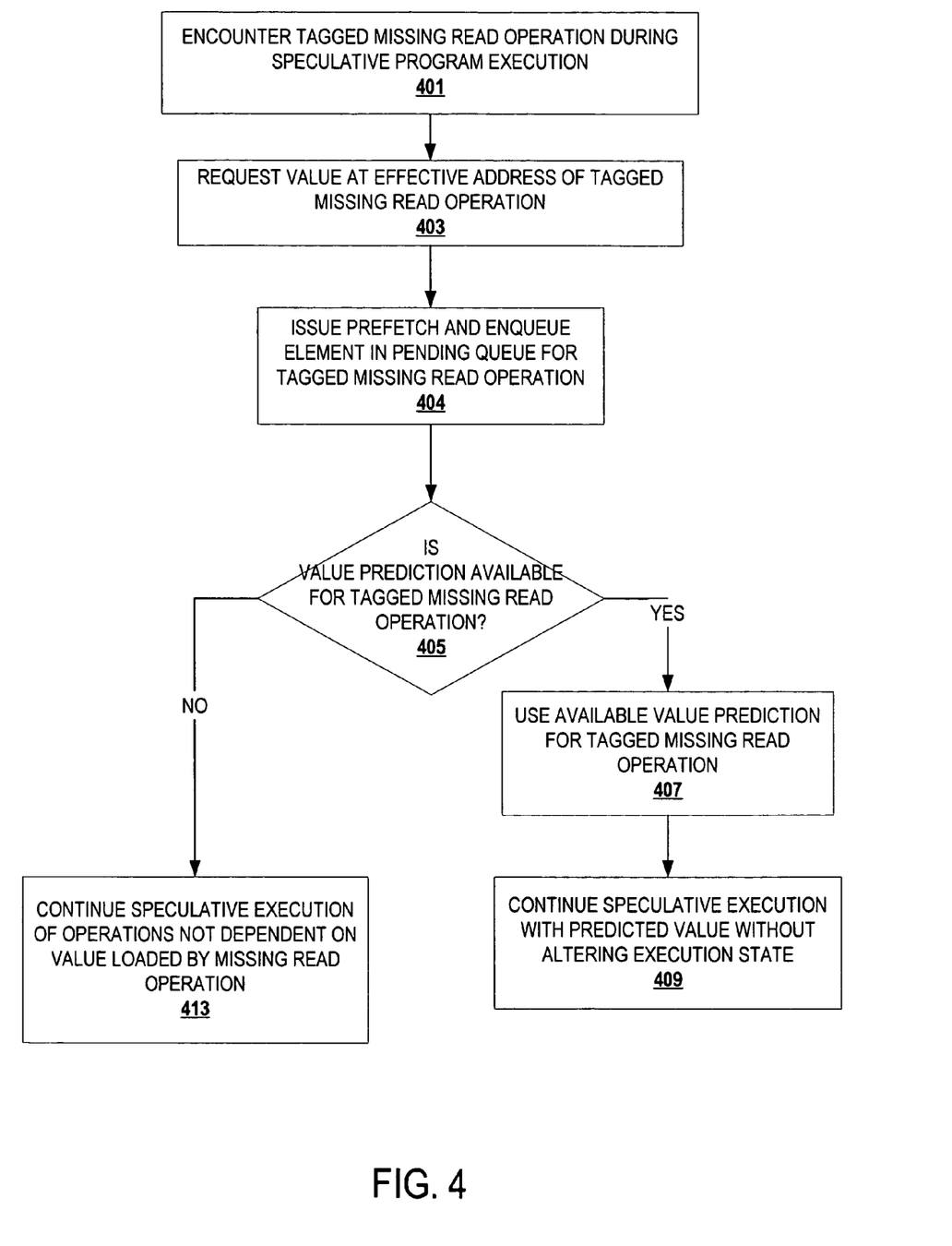
FIG. 4 depicts an exemplary flowchart for value predicting.

FIG. 4 depicts an exemplary flowchart for value predicting. At block 401, a candidate missing read operation is encountered during speculative program execution. The read operation has been tagged in accordance with profile information that indicates the read operation as most likely to miss in memory. At block 403, the value at the effective address of the candidate missing read operation is requested. At block 404, a prefetch is issued and an element is enqueued in the pending prefetch queue for the candidate missing read operation. At block 405, it is determined whether a value prediction is available for the candidate missing read operation. If there is a value prediction available, then control flows to block 407. If a value prediction is not available, then control flows to block 413.

At block 407, an entry in the value predictor structure that corresponds to the candidate missing read operation is accessed. The available value prediction from the value predictor structure is utilized for the candidate missing read operation. At block 409, speculative execution continues with the value prediction for the candidate missing read operation without altering execution state.

At block 413, speculative execution of operations independent of the candidate missing read operation continues.

Employing software value prediction that value predicts during latent time periods allows employment of value prediction without a hardware value predictor and without impacting performance. The software value predictor does not attempt to access an unavailable value. Either a value is already present in the value predictor structure or a prefetch request is submitted. Hence, value prediction operates under the cover of a latency event and facilitates more aggressive speculative execution. In addition, focusing on read operations identified as most likely to miss with profile information targets the most substantial source of stalls on a processing unit.

The functionality of software value prediction can be delivered with data structures of a variety of types and organization. Software value prediction may be realized with a number of different data structures, such as that illustrated in FIG. 2. Another exemplary data structure is provided in FIG. 5, but again, this exemplary implementation is meant to aid in understanding the invention and not meant to be limiting upon the invention.

Figure 5:
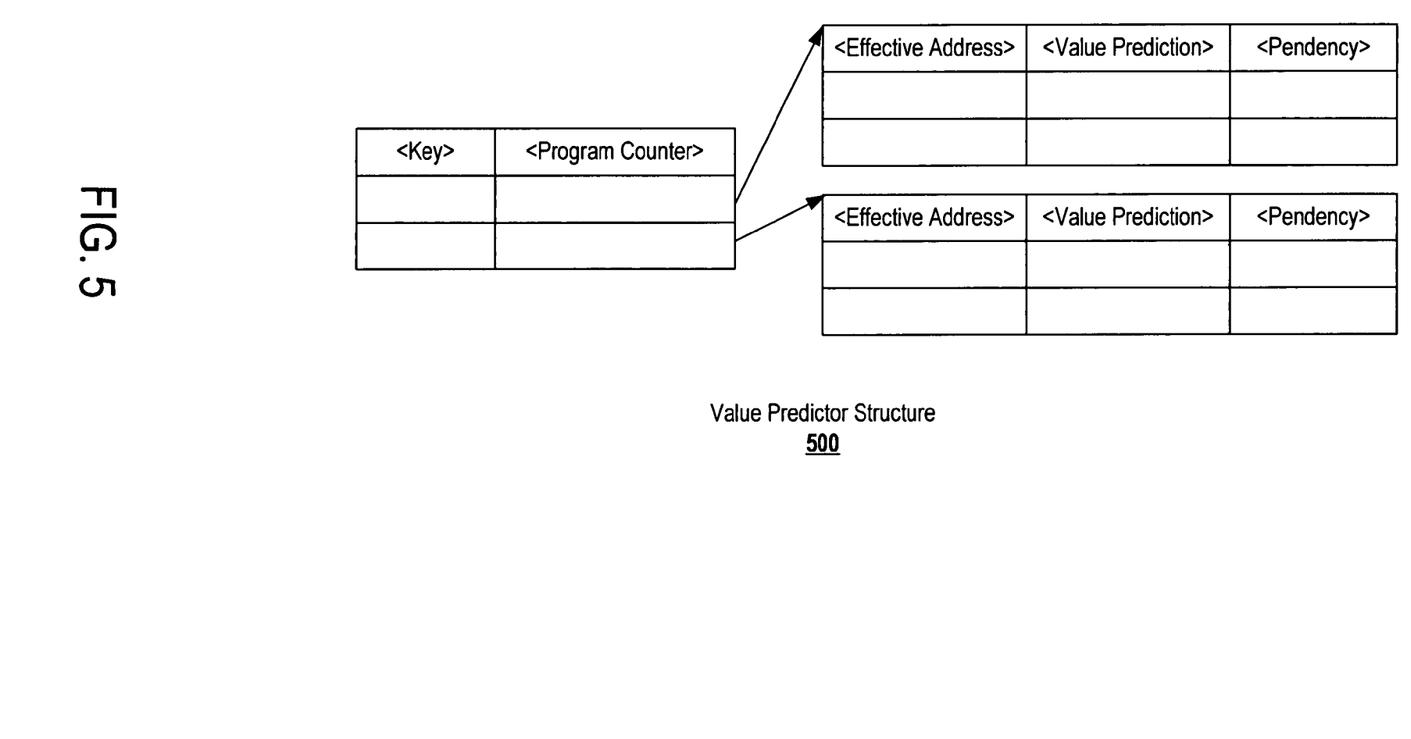
FIG. 5 depicts an exemplary value predictor table.

FIG. 5 depicts an exemplary value predictor table. Each entry of a value predictor table 500 includes a key field and a program counter field. Each entry also includes reference to one or more elements, each of which includes an effective address field, a value prediction field, and a pendency field. Instead of maintaining separate structures as in FIG. 2, the information is merged into a single data structure. Each entry is keyed with a unique identifier for a particular operation, such as a hash of the operation's program counter. The program counter facilitates verification that a selected entry is the correct entry. Each entry can store multiple effective addresses and corresponding value predictions and pendency values. The effective addresses indicate source addresses for values of a read operation for which a prefetch request has been submitted. To illustrate utilization of such value predictor structure, a missing read operation may be encountered in a loop numerous times during speculative execution with different effective addresses. Hence, each entry for a candidate missing read operation can retain encountered effective addresses and properly set the corresponding pendency and value prediction fields for the candidate missing read operation. The pendency field indicates whether a prefetch request has been fulfilled or is pending. Additional fields not illustrated may include a confidence or strength field, multiple value prediction fields for each effective address, etc. For example, assume that the value predictor table 500 maintains 4 value predictions per entry. Assuming that last-value value prediction is being employed, then the value predictions are the last 4 values seen for the corresponding read operation represented by the entry. Each value prediction will be associated with its own confidence field. Each time one of the value predictions is seen and verified, the corresponding confidence field is incremented. An implementation may also decrement confidence indicators of non-verified value predictions. The following flowcharts are exemplary flowcharts for accessing a merged value predictor structure.

Figure 6:
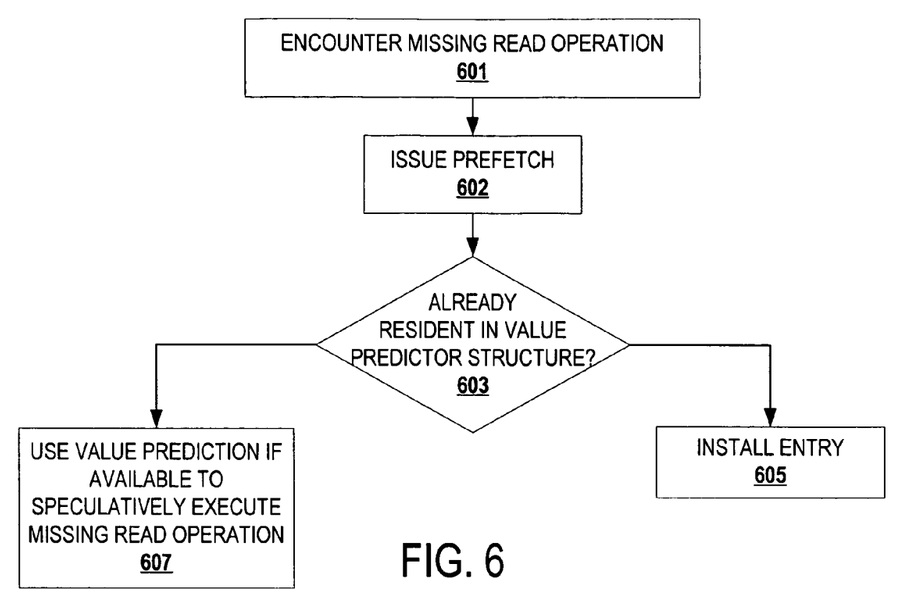
FIG. 6 depicts an exemplary flowchart for installing an entry in the merged value predictor structure.

FIG. 6 depicts an exemplary flowchart for installing an entry in the merged value predictor structure. At block 601, a candidate missing read operation is encountered. At block 602, a prefetch is issued for the candidate missing read operation. At block 603, it is determined whether an entry is already resident in the value predictor structure for the candidate missing read operation. If there is a resident entry, then control flows to block 607. If there is not a resident entry, then control flows to block 605.

At block 605, an entry is installed in the value predictor structure.

At block 607, an available value prediction (e.g., the value prediction with the most confidence) is used to speculatively execute the candidate missing read operation. Although a value prediction may be present, it may not have sufficient confidence, and therefore be unavailable.

Figure 7:
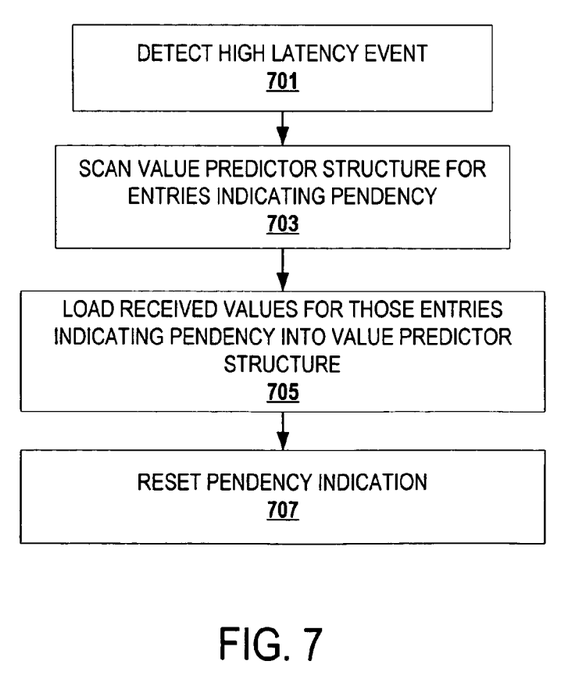
FIG. 7 depicts an exemplary flowchart for updating a value predictor structure.

FIG. 7 depicts an exemplary flowchart for using a value predictor structure. At block 701, a latency event is detected. At block 703, taking advantage of the latency event, the value predictor structure is scanned for entries indicating previously pending prefetch requests. At block 705, values are loaded into the value predictor structure for those entries with pending indication (i.e., values returned for prefetches issued during an earlier speculative execution are loaded, which may become value predictions, depending on confidence). At block 707, the pendency indication(s) is reset.

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.). For example, block 313 of FIG. 3 may be performed before or in parallel with block 311; blocks 705 and 707 of FIG. 7 may be performed in conjunction with each other; etc.

The software value predictor may be deployed with various techniques. For example, with speculative execution scout threads, a static/dynamic compiler that generates the speculative execution scout threads can generate code at the head of the scout threads and convert candidate missing read operations into prefetch request operations. The code generated at the head of a scout scans a value predictor structure and inserts results of previously submitted prefetch requests into the value predictor structure. This code can be performed prior to the main chores of speculative execution. In addition, for each candidate missing read operation (as indicated by profile feedback), the compiler generates code to perform speculative execution and converts each candidate missing read operation into a prefetch request to avoid stalling an in-order processing unit.

In another example, traps are utilized to transfer control to value prediction code. With hardware speculative execution, upon entering speculative execution mode, a processing unit generates a fast user trap of a type specific for transferring control to a first user code. The user code performs the relevant operations to update the value predictor structure with results of previously submitted prefetch requests. Upon identifying a candidate missing read operation during speculative execution, such as a load that misses in cache, the processing unit generates a fast user trap of a type specific for transferring control to a second user code. The second user code retrieves a value prediction and/or submits a prefetch request for the candidate missing read operation.

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable storage medium includes magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; and the like. The machine-readable transmission medium includes electrical, optical, acoustical or other form of propagated signal (e.g., carrier waves, infrared signals, digital signals, etc.), and the like.

While the invention has been described with reference to various realizations, it will be understood that these realizations are illustrative and that the scope of the invention is not limited to them. Many variations, modifications, additions, and improvements are possible. For example, a value predictor structure may include a single data structure or multiple data structures, confidence fields, program counters as keys instead of hashes, etc. More generally, realizations in accordance with the present invention have been described in the context of particular realizations. For example, the blocks and logic units identified in the description are for understanding the described invention and not meant to limit the described invention. Functionality may be separated or combined in blocks differently in various realizations of the invention or described with different terminology.

These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A machine-readable storage medium embodied as a tangible object, the storage medium encoded with instructions which, when executed by a machine, cause the machine to:
   determine which read operations are most likely to encounter a cache miss and identify the read operations as candidate missing read operations in advance of attempting execution thereof;
   value predict for the candidate missing read operations during speculative execution of a code that includes the candidate missing read operations if corresponding value predictions are available thereof;
   request prefetching for the candidate missing read operations and record an indication of pendency and effective address thereof in one or more value predictor structures; and
   utilize completed prefetch requests to update the one or more value predictor structures.

2. The machine-readable storage medium of claim 1, wherein the completed prefetch requests were submitted during an earlier speculative execution of the code.

3. The machine-readable storage medium of claim 1, wherein the candidate missing read operations are identified using profiling information.

4. The machine-readable storage medium of claim 1, wherein the sets of instruction when executed by the machine, further cause the machine to:
   record the candidate missing read operations without available value predictions in a queue for pending prefetch requests; and
   record the pendency indication in the queue.

5. The machine-readable storage medium of claim 4, wherein the sets of instruction when executed by the machine, further cause the machine to record the value predictions in a value predictor table.

6. The machine-readable storage medium of claim 1, wherein the candidate missing read operations without available value predictions, the value predictions, and the pendency indication are recorded in a data structure.

7. The machine-readable storage medium of claim 6, wherein the data structure includes at least one of a tree, a hash table, a linked list, and a combination of data structures.

8. The machine-readable storage medium of claim 1, wherein the sets of instruction when executed by the machine, further cause the machine to record confidence of value predictions.

9. The machine-readable storage medium of claim 1, wherein the sets of instruction when executed by the machine, further cause the machine to maintain a history of previous value predictions.

10. The machine-readable storage medium of claim 1, wherein triggering of speculative execution of a program includes the candidate missing read operations.

11. The machine-readable storage medium of claim 10, wherein the speculative execution is implemented with at least one of hardware or scout threads.

12. A computer implemented method comprising:
    determining which read operation is most likely to encounter a cache miss and identifying the read operation as a candidate missing read operation in advance of attempting execution thereof;
    determining whether outstanding prefetch requests have completed;
    recording values from completed prefetch requests as value predictions;
    determining if a value prediction is available for a speculatively executed candidate missing read operation;
    supplying the value prediction if available for the candidate missing read operation;
    requesting prefetching for the candidate missing read operation; and
    recording an indication of pendency of the prefetch request.

13. The method of claim 12, wherein a recorded value is available if its confidence is sufficient.

14. The method of claim 12, further comprising recording a program counter and an effective address of the candidate missing read operation.

15. The method of claim 14, wherein the effective address, the program counter, the pendency indication, and a corresponding value prediction for the candidate missing read operation are recorded in a first data structure.

16. The method of claim 15, wherein the effective address, the program counter, and the pendency of the prefetch request for the candidate missing read operation are recorded in a first data structure, and the effective address, the program counter, and a corresponding value prediction for the candidate missing read operation are recorded in a second data structure.

17. The method of claim 16, wherein the first data structure includes a queue of pending prefetch requests.

18. The method of claim 12 further comprising verifying recorded value predictions with actual values.

19. The method of claim 18 further comprising recording a confidence of value prediction in accordance with the verification.

20. The method of claim 12, wherein the candidate missing read operation is speculatively executed with a speculative execution mechanism.

21. The method of claim 20, wherein the speculative execution mechanism includes scout threads or a hardware implementation of speculative execution.

22. The method of claim 12 further comprising maintaining a history of value predictions.

23. A machine-readable storage medium embodied as a tangible object, the storage medium encoded with instructions comprising:

a first sequence of code to determine which read operations are most likely to encounter a cache miss and identify the read operations as candidate missing read operations in advance of attempting execution thereof;

a second sequence of instruction executable to generate pending prefetch update code for execution coincident with the candidate missing read operations of a program, wherein the pending prefetch update code updates value predictions with values from previously pending prefetch requests that have completed; and a third sequence of instruction executable to generate value predictor code for execution coincident with encountering candidate missing read operations, the value predictor code to value predict for candidate missing read operations if corresponding value predictions are available and to request prefetching and to record pendency of the prefetch requests and to record effective addresses thereof.

24. The machine readable storage medium of claim 23 further comprising the first sequence of instructions to install instances of the pending prefetch update code at heads of corresponding scout thread code.

25. The machine readable storage medium of claim 23 further comprising the second sequence of instructions installing instances of the value predictor code proximate to corresponding candidate missing read operations.

26. The machine readable storage medium of claim 25, further comprising converting candidate missing read operations into prefetch requests.

27. The machine readable storage medium of claim 23, wherein the candidate missing read operations are read operations identified by a profiler as candidate missing read operations.

28. The machine readable storage medium of claim 23, wherein the pending prefetch update code is installed as trap handler code responsive to traps generated from a read operation missing.

29. The machine readable storage medium of claim 23, wherein the value predictor code is installed as trap handler code responsive to traps generated from a read operation missing during speculative execution.

30. A machine-readable storage medium embodied as a tangible object, the storage medium encoded with instructions comprising:

a first sequence of code to determine which read operations are most likely to encounter a cache miss and identify the read operations as candidate missing read operations in advance of attempting execution thereof;

a second sequence of instruction executable to record indications of the candidate missing read operations and effective addresses thereof and to record indications of pendency of prefetch requests thereof, and to record values from the recorded effective addresses for use in value predictions; and a third sequence of instructions executable to utilize the recorded values to value predict for candidate missing read operations, allowing program execution to continue past the candidate missing read operations.

31. The machine readable storage medium of claim 30, further comprising resetting the indications of pendency after return of values from effective addresses corresponding thereto.

32. The machine readable storage medium of claim 30, wherein the first sequence of instructions records the effective addresses and indications of pendency when corresponding read operations miss.

33. The machine readable storage medium of claim 30, further comprising the first sequence of instructions executable to determine whether values have returned for pending prefetch requests during a high-latency event.

34. The machine readable storage medium of claim 30 further comprising a third sequence of instructions executable to verify the value predictions against actual values.

35. The machine readable storage medium of claim 34 further comprising the third sequence of instructions executable to record indications of confidence in accordance with the verification of value predictions.

36. The machine readable storage medium of claim 30, wherein the first and second sequences of instructions record into a same data structure.

37. The machine readable storage medium of claim 30, wherein the first and second sequences of instructions record into multiple data structures.

38. The machine readable storage medium of claim 37, wherein the multiple data structures include a queue of pending prefetch requests and a value predictor table.

39. The machine readable storage medium of claim 30, wherein the indications of the candidate missing read operations include program counters.

40. The machine readable storage medium of claim 30, wherein the second sequence of instructions value predicts for those candidate missing read operations encountered during speculative execution.

41. The machine readable storage medium of claim 40, wherein the speculative execution is implemented with hardware, scout threads, or both scout threads and hardware.

42. The machine readable storage medium of claim 40, wherein the second sequence of instructions value predicts for candidate missing read operations identified by a profiler.

43. An apparatus comprising:
a first memory;
a second memory; and
means for determining which read operations are most likely to encounter a cache miss and identifying the read operations as candidate missing read operations in advance of attempting execution thereof, prefetching the candidate missing read operations in the first memory and recording effective addresses of the candidate missing read operations and indications of pendency of the prefetching, and value predicting for the candidate missing read operations in the first memory with values returned from the prefetching.

44. The apparatus of claim 43, wherein the first memory include low-latency memory, and the second memory includes high-latency memory.

45. The apparatus of claim 43 further comprising means for verifying value predictions.

* * * * *